US012132268B2

(12) United States Patent
Shen

(10) Patent No.: US 12,132,268 B2
(45) Date of Patent: Oct. 29, 2024

(54) ANTENNA MODULE

(71) Applicant: Wistron Corporation, New Taipei (TW)

(72) Inventor: Su Mei Shen, New Taipei (TW)

(73) Assignee: Wistron Corporation, New Taipei (TW)

( * ) Notice: Subject to any disclaimer, the term of this patent is extended or adjusted under 35 U.S.C. 154(b) by 153 days.

(21) Appl. No.: 18/154,025

(22) Filed: Jan. 12, 2023

(65) Prior Publication Data

US 2024/0170843 A1 May 23, 2024

(30) Foreign Application Priority Data

Nov. 21, 2022 (TW) .................................. 111144326

(51) Int. Cl.
*H01Q 5/307* (2015.01)
*H01Q 1/48* (2006.01)
*H01Q 9/04* (2006.01)

(52) U.S. Cl.
CPC ............... *H01Q 5/307* (2015.01); *H01Q 1/48* (2013.01); *H01Q 9/0407* (2013.01)

(58) Field of Classification Search
CPC .......... H01Q 5/30; H01Q 5/307; H01Q 5/371; H01Q 5/378; H01Q 1/48; H01Q 1/52; H01Q 1/521; H01Q 9/04; H01Q 9/0407; H01Q 9/0414; H01Q 9/42; H01Q 21/28
See application file for complete search history.

(56) References Cited

U.S. PATENT DOCUMENTS

| | | | | |
|---|---|---|---|---|
| 8,174,457 B1 * | 5/2012 | Lam | H01Q 9/42 343/846 |
| 9,077,066 B1 * | 7/2015 | Lee | H01Q 9/0407 |
| 10,044,101 B1 * | 8/2018 | Nair | H01Q 1/243 |

(Continued)

FOREIGN PATENT DOCUMENTS

JP 2009182608 8/2009

OTHER PUBLICATIONS

Shota Sugimoto et al., "A Study of Broadband Monopole Antenna with Parasitic Elements", Proceedings of the 2009 IEICE General Conference, Mar. 17-20, 2009, with English translation thereof, pp. 124.

(Continued)

*Primary Examiner* — Jason M Crawford
(74) *Attorney, Agent, or Firm* — JCIPRNET

(57) ABSTRACT

An antenna module includes an antenna structure including ground, first, second, and third radiators. The ground radiator includes a main ground portion and a branch portion extending from one side of the main ground portion. The first radiator located on the one side of the main ground portion includes a feeding terminal. The second radiator is connected to the one side of the main ground portion. The first radiator is located between the branch portion and the second radiator. The main ground portion, the branch portion, and the first and second radiators together form a waveguide structure. The first and second radiators are configured to excite a first high frequency band. The third radiator is located on the one side of the main ground portion, connected to the first radiator, and located beside the branch portion. The first and third radiators are configured to excite a second high frequency band.

18 Claims, 3 Drawing Sheets

(56) References Cited

U.S. PATENT DOCUMENTS

| | | | | |
|---|---|---|---|---|
| 11,011,824 | B2 | 5/2021 | Nishikawa et al. | |
| 2009/0189815 | A1 | 7/2009 | Hotta et al. | |
| 2012/0242555 | A1* | 9/2012 | Hsieh | H01Q 5/378 343/860 |
| 2012/0249393 | A1 | 10/2012 | Hotta et al. | |
| 2012/0326943 | A1* | 12/2012 | Flores-Cuadras | H01Q 9/42 343/893 |
| 2013/0234911 | A1* | 9/2013 | Lee | H01Q 1/243 343/893 |
| 2014/0361948 | A1* | 12/2014 | Tanaka | H01Q 1/243 343/861 |
| 2016/0049732 | A1* | 2/2016 | Huang | H01Q 5/378 216/13 |
| 2022/0247078 | A1* | 8/2022 | Wang | H01Q 5/335 |
| 2022/0320724 | A1* | 10/2022 | Deng | H01Q 1/523 |
| 2022/0352625 | A1* | 11/2022 | Wu | H01Q 1/48 |
| 2023/0145638 | A1* | 5/2023 | Matsushima | H01Q 9/0428 343/848 |
| 2023/0216195 | A1* | 7/2023 | Wang | H01Q 9/065 343/848 |
| 2024/0170843 | A1* | 5/2024 | Shen | H01Q 5/378 |

OTHER PUBLICATIONS

"Office Action of Taiwan Counterpart Application", issued on Oct. 5, 2023, p. 1-p. 5.

Le Huy Trinh et al., "Reconfigurable Antenna for Future Spectrum Reallocations in 5G Communications", IEEE Antennas and Wireless Propagation Letters, Dec. 4, 2015, pp. 1297-1300, vol. 15.

"Search Report of Europe Counterpart Application", issued on Aug. 23, 2023, p. 1-p. 9.

* cited by examiner

ANTENNA MODULE

CROSS-REFERENCE TO RELATED APPLICATION

This application claims the priority benefit of Taiwan patent application no. 111144326, filed on Nov. 21, 2022. The entirety of the above-mentioned patent application is hereby incorporated by reference herein and made a part of this specification.

BACKGROUND

Technical Field

The disclosure relates to an antenna module; more particularly, the disclosure relates to an antenna module capable of exciting multiple frequency bands.

Description of Related Art

With the advancement of science and technology, users' demands for multi-band antennas are increasing day by day. How to design an antenna that excites multiple frequency bands, has a reduced dimension, and has good radiation efficiency is one of the targets which people in the pertinent art are endeavored to achieve.

SUMMARY

The disclosure provides an antenna module capable of meeting a requirement for multiple frequency bands.

An embodiment of the disclosure provides an antenna module that includes at least one antenna structure. Each of the at least one antenna structure includes a ground radiator, a first radiator, a second radiator, and a third radiator. The ground radiator includes a main ground portion and a branch portion extending from one side of the main ground portion. The first radiator is located on the one side of the main ground portion and includes a feeding terminal. The second radiator is connected to the one side of the main ground portion of the ground radiator. The first radiator is located between the branch portion and the second radiator. The main ground portion, the branch portion, the first radiator, and the second radiator together form a waveguide structure. The second radiator is disposed beside the first radiator, and the first radiator and the second radiator are configured to excite a first high frequency band. The third radiator is located on the one side of the main ground portion of the ground radiator, connected to the first radiator, and located beside the branch portion. The first radiator and the third radiator are configured to excite a second high frequency band.

In an embodiment of the disclosure, each of the at least one antenna structure further includes a fourth radiator located on the one side of the main ground portion of the ground radiator and connected to the first radiator, and the first radiator and the fourth radiator are configured to excite a low frequency band.

In an embodiment of the disclosure, the second radiator is connected to the first radiator through a portion of the fourth radiator, the branch portion, the first radiator, and the second radiator are parallel to one another, and a distance between the first radiator and the second radiator is smaller than a distance between the first radiator and the branch portion.

In an embodiment of the disclosure, the distance between the first radiator and the second radiator ranges from 0.3 mm to 0.7 mm, and the distance between the first radiator and the branch portion ranges from 0.8 mm to 1.2 mm.

In an embodiment of the disclosure, the branch portion, the first radiator, and the second radiator extend along a first direction from the one side of the main ground portion and are disposed side by side along a second direction perpendicular to the first direction, and an edge of the fourth radiator in the second direction exceeds an edge of the main ground portion in the second direction.

In an embodiment of the disclosure, the fourth radiator includes a first portion and a second portion, the first radiator is located between the first portion and the second portion, and the second radiator is connected to the first portion.

In an embodiment of the disclosure, the first portion includes a first section, a second section, and a third section connected in a zigzag manner, the first section is connected to the second portion, the third section is located between the first section and the main ground portion, the third section includes an overlapping region, and a projection of the overlapping region onto the main ground portion along the first direction overlaps the main ground portion.

In an embodiment of the disclosure, a length of the overlapping region in the second direction is less than 5 mm.

In an embodiment of the disclosure, a length of the first radiator and a length of the fourth radiator range from 0.2 times a wavelength of the low frequency band to 0.3 times the wavelength of the low frequency band.

In an embodiment of the disclosure, a length of the first radiator and a length of the second radiator range from 0.2 times a wavelength of the first high frequency band to 0.3 times the wavelength of the first high frequency band.

In an embodiment of the disclosure, a length of the first radiator and a length of the third radiator range from 0.2 times a wavelength of the second high frequency band to 0.3 times the wavelength of the second high frequency band.

In an embodiment of the disclosure, the branch portion, the first radiator, and the second radiator extend along a first direction from the one side of the main ground portion and are disposed side by side along a second direction perpendicular to the first direction, and a width of the main ground portion is gradually reduced along the second direction.

In an embodiment of the disclosure, the main ground portion is of a triangular shape or a rectangular shape.

In an embodiment of the disclosure, the at least one antenna structure includes two antenna structures mirror disposed on two sides of a median line, the third radiator of one of the two antenna structures faces the third radiator of the other of the two antenna structures, and a distance between the third radiator of one of the two antenna structures and the third radiator of the other of the two antenna structures is larger than or equal to 0.5 times a wavelength of the second high frequency band.

In an embodiment of the disclosure, the ground radiator of one of the two antenna structures is separated from the ground radiator of the other of the two antenna structures.

In an embodiment of the disclosure, a distance between the ground radiator of one of the two antenna structures and the ground radiator of the other of the two antenna structures is larger than or equal to 1 mm.

In an embodiment of the disclosure, each of the two antenna structures further includes a fourth radiator located on the one side of the main ground portion of the corresponding ground radiator and connected to the corresponding first radiator, and the first radiator and the corresponding fourth radiator are configured to excite a low frequency band.

In an embodiment of the disclosure, the fourth radiator includes a first portion away from the median line and a second portion close to the median line, the first radiator is located between the first portion and the second portion, and a length of the first portion is greater than a length of the second portion.

In view of the above, each of the at least one antenna structure of the antenna module provided in one or more embodiments of the disclosure includes the ground radiator, the first radiator, the second radiator, and the third radiator. The ground radiator includes the main ground portion and the branch portion extending from one side of the main ground portion. The first radiator is located on the one side of the main ground portion and includes the feeding terminal. The second radiator is connected to the one side of the main ground portion of the ground radiator. The first radiator is located between the branch portion and the second radiator. The third radiator is located on the one side of the main ground portion of the ground radiator, connected to the first radiator, and located beside the branch portion. The main ground portion, the branch portion, the first radiator, and the second radiator together form the waveguide structure. The first radiator and the second radiator are configured to excite the first high frequency band, and the first radiator and the third radiator are configured to excite the second high frequency band. Under said configuration, the antenna module provided in one or more embodiments of the disclosure is able to comply with the requirements for multiple frequency bands.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE EMBODIMENTS

The existing commercially available wireless communication devices are mainly developed to have housings made of all-aluminum-magnesium materials, miniaturized dimensions, and high data transmission efficiencies. To achieve the high data transmission efficiency, the wireless communication system adopts a multi-input multi-output (MIMO) multi-antenna system to simultaneously transmit signals of multiple frequency bands.

However, in order to comply with the requirement for miniaturization, the antennas are likely to be placed excessively close to each other, thus resulting in poor antenna-to-antenna isolation and further reducing the data transmission efficiency. An antenna module 10 satisfying the requirements for multiple frequency bands at the same time (WiFi 2.4G and WiFi 7, i.e., a frequency band ranging from 2.4 GHz to 2.5 GHz and 5.15 GHz to 7.125 GHz) and having good antenna antenna-to-antenna isolation and good antenna radiation efficiency is introduced below.

Figure 1:
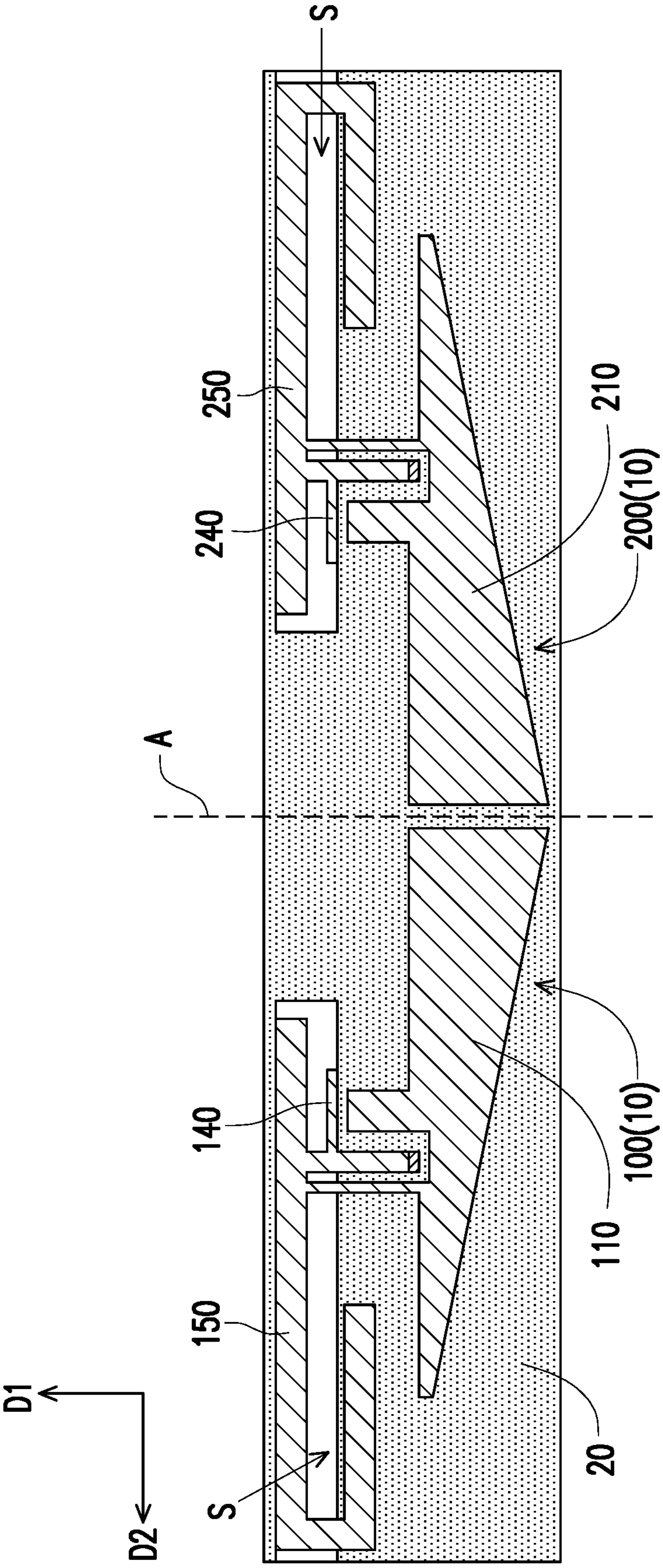
FIG. 1 is a schematic view illustrating an appearance of an antenna module disposed in a housing according to an embodiment of the disclosure

FIG. 1 is a schematic view illustrating an appearance of an antenna module disposed in a housing according to an embodiment of the disclosure. With reference to FIG. 1, the antenna module 10 includes at least one antenna structure. Specifically, in an embodiment of the disclosure, the at least one antenna structure includes two antenna structures 100 and 200, and the two antenna structures 100 and 200 are mirror disposed on two sides of a median line A.

The antenna module 10 is composed of asymmetric antenna structures 100 and 200 improved on the basis of a balanced dipole antenna. A length and a width of the balanced dipole antenna are, for instance, 100 mm and 36 mm, and a length and a width of the antenna module 10 in an embodiment are, for instance, 75 mm and 14.5 mm. It should be mentioned that being “asymmetric” here refers to one single antenna structure in asymmetry up and down; that is, a radiator and a ground plane are asymmetric. Since the two antenna structures 100 and 200 are structurally the same, the antenna structure 100 shown on the left side in FIG. 1 is elaborated first. In fact, the two antenna structures 100 and 200 achieve the same technical effects.

Figure 2:
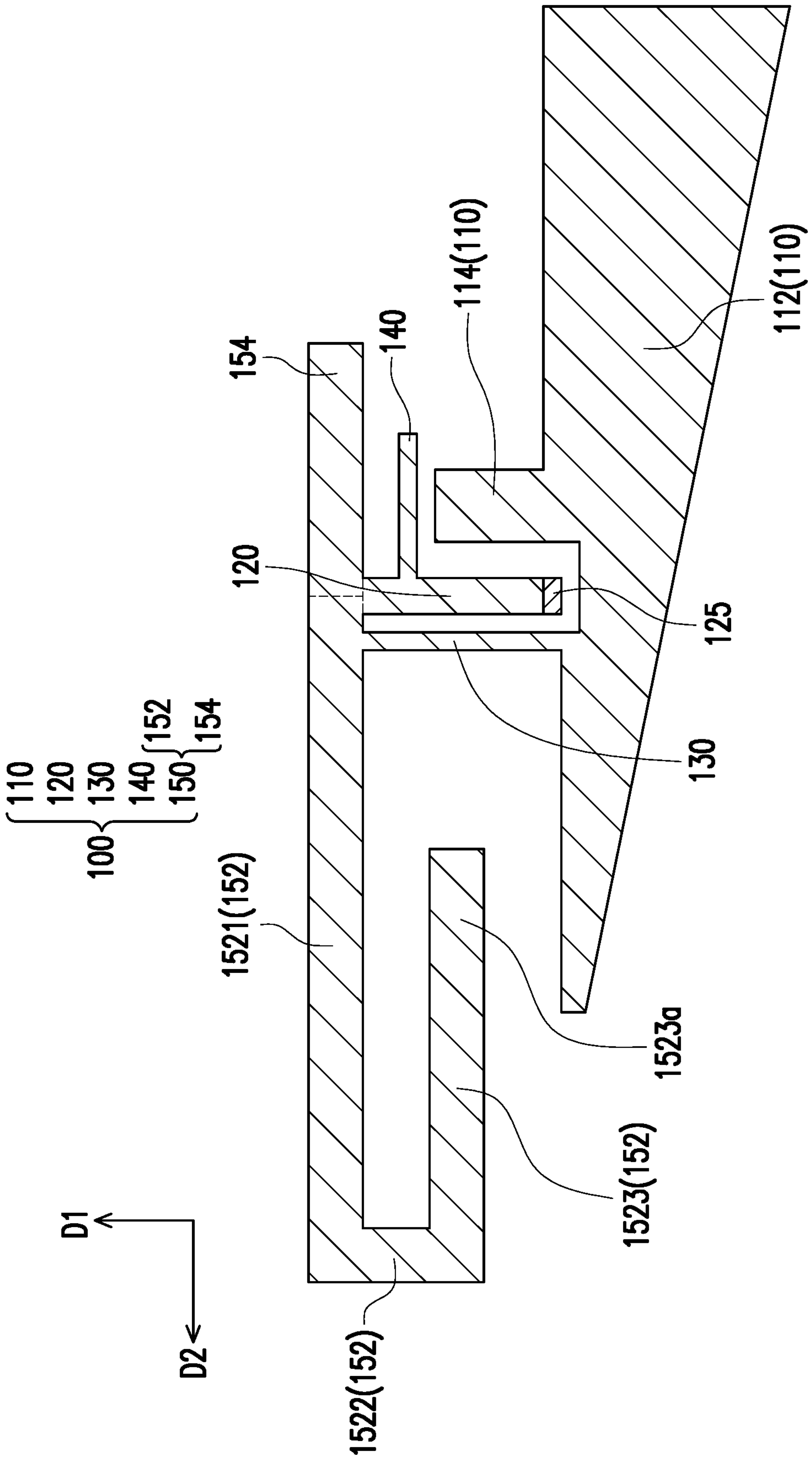
FIG. 2 is a schematic view illustrating the appearance of one of the antenna structures of the antenna module depicted in FIG. 1.

FIG. 2 is a schematic view illustrating the appearance of one of the antenna structures of the antenna module depicted in FIG. 1. With reference to FIG. 2, according to an embodiment of the disclosure, each of the antenna structures 100 and 200 includes a ground radiator 110, a first radiator 120, and a second radiator 130. The ground radiator 110 includes a main ground portion 112 and a branch portion 114 extending from one side of the main ground portion 112. The main ground portion 112 is of a triangular shape or a rectangular shape, which should however not be construed as a limitation in the disclosure. A length and a width of the branch portion 114 in an embodiment are, for instance, 4 mm and 2 mm, respectively.

The first radiator 120 includes a feeding terminal 125, and the first radiator 120 is located on the one side of the main ground portion 112. The second radiator 130 is connected to the one side of the main ground portion 112 of the ground radiator 110. There is a coaxial transmission line (not shown) between the feeding terminal 125 and the main ground portion 112. A positive terminal of the coaxial transmission line is connected to the feeding terminal 125, and a negative terminal of the coaxial transmission line is connected to the main ground portion 112.

Specifically, the branch portion 114, the first radiator 120, and the second radiator 130 extend from the one side of the main ground portion 112 along a first direction D1 and are parallel to one another, and the branch portion 114, the first radiator 120, and the second radiator 130 are disposed side by side along a second direction D2 perpendicular to the first direction D1. The second radiator 130 is disposed beside the first radiator 120, and the first radiator 120 is located between the branch portion 114 and the second radiator 130. The first direction D1 and the second direction D2 are, for instance, a width direction and a longitudinal direction of the antenna structure 100, respectively.

In addition, a distance between the first radiator 120 and the second radiator 130 is smaller than a distance between the first radiator 120 and the branch portion 114. For instance, the distance between the first radiator 120 and the second radiator 130 ranges from 0.3 mm to 0.7 mm, and the distance between the first radiator 120 and the branch portion 114 ranges from 0.8 mm to 1.2 mm. In an embodiment, the distance between the first radiator 120 and the second radiator 130 is, for instance, 0.5 mm, and the distance between the first radiator 120 and the branch portion 114 is, for instance, 1 mm.

In an embodiment, the main ground portion 112, the branch portion 114, the first radiator 120, and the second radiator 130 together form an asymmetric co-planar waveguide structure for increasing a high frequency bandwidth. In addition, the first radiator 120 and the second radiator 130 are configured to excite a first high frequency band, and the first high frequency band is, for instance, a 5G frequency band (5.15 GHz to 5.85 GHz). A length of the first radiator 120 and a length of the second radiator 130 range from 0.2 times a wavelength of the first high frequency band to 0.3 times the wavelength of the first high frequency band. In an embodiment of the disclosure, the length of the first radiator 120 and the length of the second radiator 130 are, for instance, 5 mm and 5.5 mm, respectively.

As shown in FIG. 2, each antenna structure 100 in an embodiment includes a third radiator 140 on the one side of the main ground portion 112 of the ground radiator 110. The third radiator 140 extends along the second direction D2 and is connected to the first radiator 120, and the third radiator 140 is located beside the branch portion 114. The first radiator 120 and the third radiator 140 are configured to excite a second high frequency band, and the second high frequency band is, for instance, a 6G frequency band (5.945 GHz to 7.125 GHz). The length of the first radiator 120 and a length of the third radiator 140 range from 0.2 times a wavelength of the second high frequency band to 0.3 times the wavelength of the second high frequency band. In an embodiment, the length of the third radiator 140 is, for instance, 4 mm.

Each antenna structure 100 further includes a fourth radiator 150 on the one side of the main ground portion 112 of the ground radiator 110. The fourth radiator 150 is connected to the first radiator 120, and the second radiator 130 is connected to the first radiator 120 through a portion of the fourth radiator 150. Specifically, the fourth radiator 150 includes a first portion 152 away from the median line A and a second portion 154 close to the median line A, and a length of the first portion 152 is greater than a length of the second portion 154. The first radiator 120 is located between the first portion 152 and the second portion 154 (at the junction), and the second radiator 130 is connected to the first portion 152. That is, one end of the first radiator 120 away from the feeding terminal 125 is connected to the first portion 152 and the second portion 154 at the same time, and the one end of the first radiator 120 away from the feeding terminal 125 is in contact with where the first portion 152 and the second portion 154 are connected (the junction).

Specifically, the first portion 152 of the fourth radiator 150 includes a first section 1521, a second section 1522, and a third section 1523 connected in a zigzag manner. The first section 1521 is connected to the second portion 154, and the third section 1523 is located between the first section 1521 and the main ground portion 112. As shown in FIG. 2, the first section 1521 of the first portion 152 is connected to the second portion 154 and extends along the second direction D2, the second section 1522 is perpendicular to the first section 1521 and the third section 1523 and extends along the first direction D1, and the first section 1521, the second section 1522, and the third section 1523 are of a hook shape.

In an embodiment of the disclosure, the first radiator 120 and the fourth radiator 150 are configured to excite a low frequency band, and the low frequency band frequency is, for instance, a WiFi 2.4G frequency band (2.4 GHz to 2.5 GHz). The length of the first radiator 120 and a length of the fourth radiator 150 range from 0.2 times a wavelength of the low frequency band to 0.3 times the wavelength of the low frequency band. In an embodiment, a sum of a length of the first section 1521 and the length of the second portion 154 is, for instance, 26 mm, a length of the second section 1522 is, for instance, 4.85 mm, a length of the third section 1523 is, for instance, 12 mm, and a width of each portion of the fourth radiator 150 is, for instance, 1.5 mm.

It is worth mentioning that the fourth radiator 150 does not directly extend out along the second direction D2 but has turning points and is hooked back, thus presenting a hook-like shape. Such a design may reduce the overall dimension of the antenna structure 100 and adjust the length of the fourth radiator 150 at the same time to excite the low frequency band.

In addition, an edge of the fourth radiator 150 in the second direction D2 exceeds an edge of the main ground portion 112 in the second direction D2. Specifically, the third section 1523 of the fourth radiator 150 includes an overlapping region 1523*a*. A projection of the overlapping region 1523*a* along the first direction D1 onto the main ground portion 112 along the first direction D1 overlaps the main ground portion 112. In an embodiment, a length of the overlapping region 1523*a* in the second direction D2 is less than 5 mm.

As shown in FIG. 2, since the overlapping region 1523*a* is located at the tail end of a path of the radiation that excites the low frequency band, the energy of the overlapping region 1523*a* is relatively low. Even if the main ground portion 112 is close to the overlapping region 1523*a*, the radiation efficiency of the low frequency band is not easily affected by the main ground portion 112 and thus remains satisfactory.

According to portion the above design, the dimension of the antenna structure 100 provided in this embodiment is smaller than the dimension of the conventional antenna, and the main ground portion 112, the branch portion 114, the first radiator 120, and the second radiator 130 of the antenna structure 100 together form the asymmetric co-planar waveguide structure, so as to increase the high frequency bandwidth. In addition, the antenna structure 100 provided in this embodiment is able to excite the low frequency band (2.4 GHz to 2.5 GHz), the first high frequency band (5.15 GHz to 5.85 GHz), the second high frequency band (5.945 GHz to 7.125 GHz), and other WiFi 2.4G and WiFi 7 frequency bands.

As shown in FIG. 1, the two antenna structures 100 and 200 provided in an embodiment of the disclosure are disposed on a housing 20, and the housing 20 is, for instance, made of an all-aluminum-magnesium material. In addition, the housing 20 has two slots S mirror disposed on two sides of the median line A, and the two slots S are disposed corresponding to the fourth radiators 150 and 250 of the two antenna structures 100 and 200, respectively. A length and a width of the slots S are, for instance, 27.5 mm and 3 mm, and the slots S are filled with a plastic material. Such a design enables the two antenna structures 100 and 200 provided in this embodiment to radiate to the outside through the slots S. It should be mentioned that the material of the housing 20 and the dimension of the slots S are not construed as limitations in the disclosure, and the length of the slots S may be adjusted between 20 mm and 30 mm.

In addition, one of the third radiators 140 and 240 of the two antenna structures 100 and 200 faces the other of the third radiators 140 and 240 of the two antenna structures 100 and 200, and a distance between the third radiators 140 and 240 of one of the antenna structures 100 and 200 and the third radiators 140 and 240 of the other of the antenna structures 100 and 200 is larger than or equal to 0.5 times the wavelength of the second high frequency band. Such a design ensures that radiation patterns of the two antenna structures 100 and 200 do not encounter a crosstalk issue (do not interfere with each other) when the two antenna structures 100 and 200 radiate the high frequency band (WiFi 7) and may have good antenna-to-antenna isolation, which leads to good performance in the radiation efficiency of the two antenna structures 100 and 200 when the two antenna structures 100 and 200 radiate the high frequency band. In addition, since the paths of radiations exciting the low frequency band run away from each other, the radiation patterns of the low frequency band extend in an outward manner and thus do not interfere with each other.

One of the ground radiators 110 and 210 of the two antenna structures 100 and 200 provided in an embodiment is separated from the other of the ground radiators 110 and 210 of the other of the two antenna structures 100 and 200. Specifically, a distance between the two ground radiators 110 and 210 is larger than or equal to 1 mm. That is, the two ground radiators 110 and 210 are not connected to each other but close to each other, so as to reduce the overall dimension of the antenna module 10.

Figure 3:
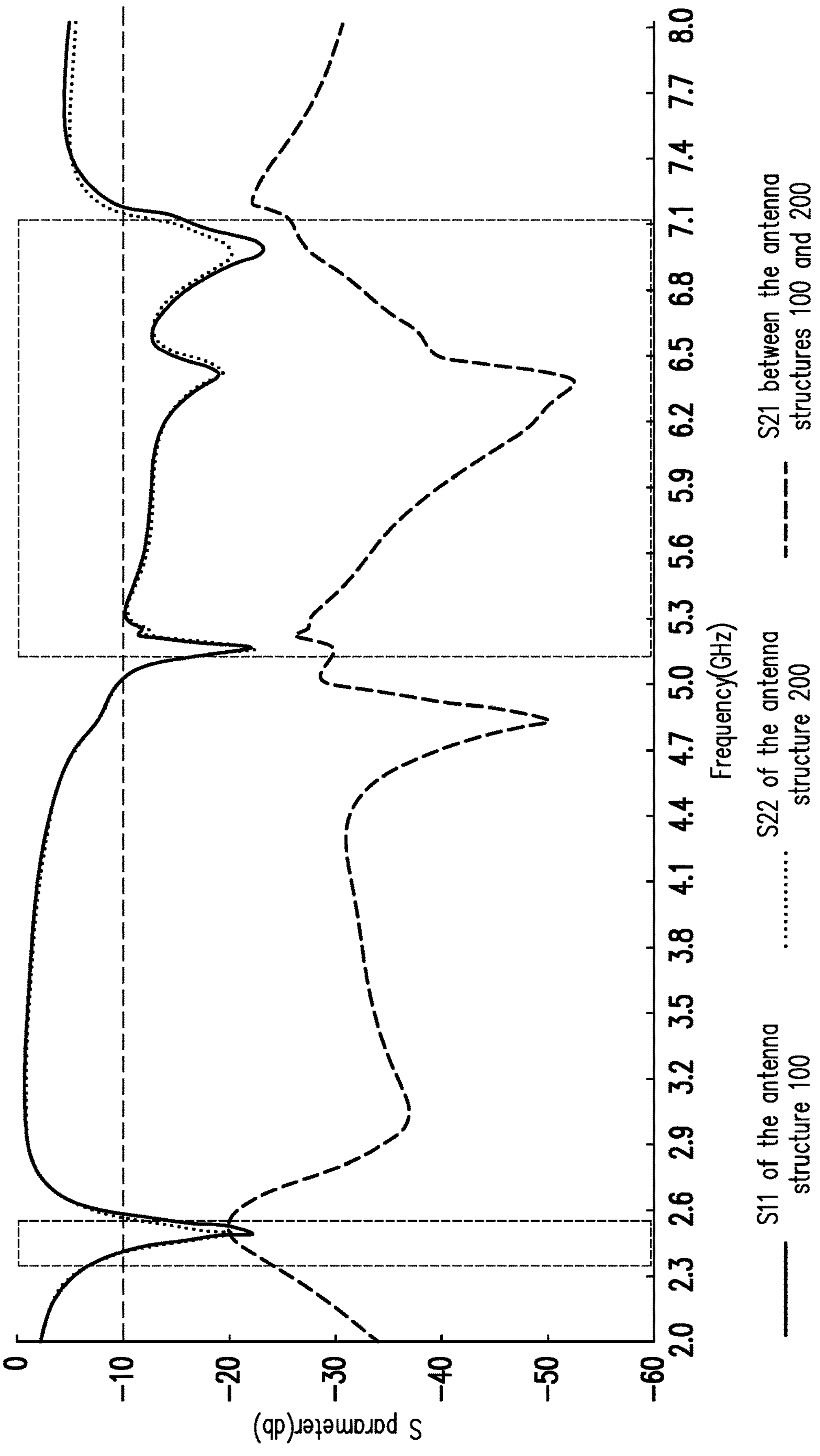
FIG. 3 is a diagram illustrating a relationship between the frequencies of the two antenna structures in FIG. 1 corresponding to S parameters S11, S22, and S21.

FIG. 3 is a diagram illustrating a relationship between the frequencies of the two antenna structures in FIG. 1 corresponding to S parameters S11, S22, and S21. With reference to FIG. 3, according to an embodiment of the disclosure, S11 of the antenna structure 100 and S22 of the antenna structure 200 are both −10 dB or lower at the low frequency band (2400 MHz to 2500 MHz), the first high frequency band. and the second high frequency band (5150 MHz to 7125 MHz). S21 between the asymmetric antenna structures 100 and 200 provided in an embodiment is higher than 20 dB at the low frequency band (2400 MHz to 2500 MHz), the first high frequency band, and the second high frequency band (5150 MHz to 7125 MHz). This means that the two asymmetric antenna structures 100 and 200 provided in this embodiment achieve favorable antenna-to-antenna isolation, and the degree of signal loss is not considerable.

A radiator and a ground surface of a conventional printed inverted-F dual-antenna (PIFA) are symmetrical, and the length of both is 0.25 times the wavelength. With the same dimension, S11 and S22 of the PIFA dual-antenna range from −4 dB to −10 dB at the low frequency band (2400 MHz to 2500 MHz), the first high frequency band, and the second high frequency band (5150 MHz to 7125 MHz), and S21 is merely higher than 13 dB at the low frequency band and higher than 20 dB at the first high frequency band and the second high frequency band. By contrast, the performance in the antenna-to-antenna isolation and in the signal transmission of the asymmetrical antenna structures 100 and 200 provided in this embodiment is superior to the performance of the conventional PIFA dual-antenna at the low frequency band or the high frequency band.

In addition, it can be learned from a 3D radiation pattern experiment that the radiation efficiencies of the two antenna structures 100 and 200 in this embodiment range from 40% to 47% at the low frequency band (2400 MHz to 2500 MHz), the first high frequency band, and the second high frequency band (5150 MHz to 7125 MHz), all of which are greater than 30%. Therefore, the two antenna structures 100 and 200 provided in this embodiment have good radiation efficiency no matter whether the two antenna structures 100 and 200 are at the low frequency band or the high frequency band.

To sum up, the main ground portion, the branch portion, the first radiator, and the second radiator of the antenna module provided in one or more embodiments of the disclosure together form the waveguide structure to increase the high frequency bandwidth. The first radiator and the second radiator are configured to excite the first high frequency band (5.15 GHz to 5.85 GHz), the first radiator and the third radiator are configured to excite the second high frequency band (5.945 GHz to 7.125 GHz), and the first radiator and the fourth radiator are configured to excite the low frequency band (2.4 GHz to 2.5 GHz). In addition, the distance between the third radiator of one of the two antenna structures and the third radiator of the other antenna structure is larger than or equal to 0.5 times the wavelength of the second high frequency band. Through the above configuration, the antenna module provided in one or more embodiments of the disclosure may meet the requirements for multiple frequency bands, have the miniaturized dimension, achieve good antenna-to-antenna isolation degree, and have good antenna radiation efficiency.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An antenna module, comprising:
at least one antenna structure, each of the at least one antenna structure comprising:
a ground radiator, comprising a main ground portion and a branch portion extending from one side of the main ground portion;
a first radiator, located on the one side of the main ground portion and comprising a feeding terminal;
a second radiator, connected to the one side of the main ground portion of the ground radiator, wherein the first radiator is located between the branch portion and the second radiator, the main ground portion, the branch portion, the first radiator, and the second radiator together form a waveguide structure, the second radiator is disposed beside the first radiator, and the first radiator and the second radiator are configured to excite a first high frequency band; and
a third radiator, located on the one side of the main ground portion of the ground radiator, connected to the first radiator, and located beside the branch portion, wherein the first radiator and the third radiator are configured to excite a second high frequency band.

2. The antenna module according to claim 1, wherein each of the at least one antenna structure further comprises a fourth radiator located on the one side of the main ground portion of the ground radiator and connected to the first radiator, and the first radiator and the fourth radiator are configured to excite a low frequency band.

3. The antenna module according to claim 2, wherein the second radiator is connected to the first radiator through a portion of the fourth radiator, the branch portion, the first radiator, and the second radiator are parallel to one another, and a distance between the first radiator and the second radiator is smaller than a distance between the first radiator and the branch portion.

4. The antenna module according to claim 3, wherein the distance between the first radiator and the second radiator ranges from 0.3 mm to 0.7 mm, and the distance between the first radiator and the branch portion ranges from 0.8 mm to 1.2 mm.

5. The antenna module according to claim 2, wherein the branch portion, the first radiator, and the second radiator extend along a first direction from the one side of the main ground portion and are disposed side by side along a second direction perpendicular to the first direction, and an edge of the fourth radiator in the second direction exceeds an edge of the main ground portion in the second direction.

6. The antenna module according to claim 5, wherein the fourth radiator comprises a first portion and a second portion, the first radiator is located between the first portion and the second portion, and the second radiator is connected to the first portion.

7. The antenna module according to claim 6, wherein the first portion comprises a first section, a second section, and a third section connected in a zigzag manner, the first section is connected to the second portion, the third section is located between the first section and the main ground portion, the third section comprises an overlapping region, and a projection of the overlapping region onto the main ground portion along the first direction overlaps the main ground portion.

8. The antenna module according to claim 7, wherein a length of the overlapping region in the second direction is less than 5 mm.

9. The antenna module according to claim 2, where a length of the first radiator and a length of the fourth radiator range from 0.2 times a wavelength of the low frequency band to 0.3 times the wavelength of the low frequency band.

10. The antenna module according to claim 1, wherein a length of the first radiator and a length of the second radiator range from 0.2 times a wavelength of the first high frequency band to 0.3 times the wavelength of the first high frequency band.

11. The antenna module according to claim 1, wherein a length of the first radiator and a length of the third radiator range from 0.2 times a wavelength of the second high frequency band to 0.3 times the wavelength of the second high frequency band.

12. The antenna module according to claim 1, wherein the branch portion, the first radiator, and the second radiator extend along a first direction from the one side of the main ground portion and are disposed side by side along a second direction perpendicular to the first direction, and a width of the main ground portion is gradually reduced along the second direction.

13. The antenna module according to claim 1, wherein the main ground portion is of a triangular shape or a rectangular shape.

14. The antenna module according to claim 1, wherein the at least one antenna structure comprises two antenna structures mirror disposed on two sides of a median line, the third radiator of one of the two antenna structures faces the third radiator of the other of the two antenna structures, and a distance between the third radiator of one of the two antenna structures and the third radiator of the other of the two antenna structures is larger than or equal to 0.5 times a wavelength of the second high frequency band.

15. The antenna module according to claim 14, wherein the ground radiator of one of the two antenna structures is separated from the ground radiator of the other of the two antenna structures.

16. The antenna module according to claim 15, wherein a distance between the ground radiator of one of the two antenna structures and the ground radiator of the other of the two antenna structures is larger than or equal to 1 mm.

17. The antenna module according to claim 14, wherein each of the two antenna structures further comprises a fourth radiator located on the one side of the main ground portion of the corresponding ground radiator and connected to the corresponding first radiator, and the first radiator and the corresponding fourth radiator are configured to excite a low frequency band.

18. The antenna module according to claim 17, wherein the fourth radiator comprises a first portion away from the median line and a second portion close to the median line, the first radiator is located between the first portion and the second portion, and a length of the first portion is greater than a length of the second portion.

* * * * *